United States Patent
Na et al.

(10) Patent No.: US 11,586,539 B2
(45) Date of Patent: Feb. 21, 2023

(54) ADAPTIVE CACHE MANAGEMENT BASED ON PROGRAMMING MODEL INFORMATION

(71) Applicant: ADVANCED MICRO DEVICES, INC., Santa Clara, CA (US)

(72) Inventors: Weon Taek Na, Bellevue, WA (US); Jagadish B. Kotra, Austin, TX (US); Yasuko Eckert, Bellevue, WA (US); Steven Raasch, Boxborough, MA (US); Sergey Blagodurov, Bellevue, WA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 16/713,940

(22) Filed: Dec. 13, 2019

(65) Prior Publication Data
US 2021/0182193 A1 Jun. 17, 2021

(51) Int. Cl.
*G06F 12/08* (2016.01)
*G06F 12/0811* (2016.01)
*G06F 12/0871* (2016.01)
*G06F 9/30* (2018.01)
*G06F 12/0882* (2016.01)
*G06F 12/1027* (2016.01)
*G06F 12/0831* (2016.01)

(52) U.S. Cl.
CPC ...... *G06F 12/0811* (2013.01); *G06F 9/30036* (2013.01); *G06F 12/0831* (2013.01); *G06F 12/0871* (2013.01); *G06F 12/0882* (2013.01); *G06F 12/1027* (2013.01)

(58) Field of Classification Search
CPC ............ G06F 12/0811; G06F 12/0831; G06F 9/30036; G06F 12/0871; G06F 12/0882; G06F 12/1027
USPC ......................................................... 711/122
See application file for complete search history.

(56) References Cited

U.S. PATENT DOCUMENTS

| 7,539,819 | B1 * | 5/2009 | Moll ..................... G06F 12/084 711/122 |
| 2017/0286118 | A1 * | 10/2017 | Coleman ............. G06F 12/0862 |
| 2019/0042415 | A1 * | 2/2019 | Boyd .................... G06F 9/3012 |

OTHER PUBLICATIONS

Sembrant, Andreas, et al., "The Direct-to-Data (D2D) Cache: Navigatin the Cache Hierarchy with a Single Lookup", Proceedings of the 41st Annual International Symposium on Computer Architecture, 2014, 12 pages.
Kotra, Jagadish B., et al., "Re-NUCA: A Practical NUCA Architecture for ReRAM Based Last-Level Caches", IEEE International Parallel Distributed Processing Symposium, 2016, 10 pages.

* cited by examiner

*Primary Examiner* — Hua J Song

(57) ABSTRACT

A processing system selectively allocates space to store a group of one or more cache lines at a cache level of a cache hierarchy having a plurality of cache levels based on memory access patterns of a software application executing at the processing system. The processing system generates bit vectors indicating which cache levels are to allocate space to store groups of one or more cache lines based on the memory access patterns, which are derived from data granularity and movement information. Based on the bit vectors, the processing system provides hints to the cache hierarchy indicating the lowest cache level that can exploit the reuse potential for a particular data.

20 Claims, 4 Drawing Sheets

ADAPTIVE CACHE MANAGEMENT BASED ON PROGRAMMING MODEL INFORMATION

GOVERNMENT LICENSE RIGHTS

This invention was made with Government support under the PathForward Project with Lawrence Livermore National Security (Prime Contract Number DE-AC52-07NA27344, Subcontract Number B620717) awarded by Department of Energy (DOE). The Government has certain rights in this invention.

BACKGROUND

A processing system typically includes a memory subsystem having memory modules to store data to be accessed by instructions being executed. The memory subsystem can be organized into a memory hierarchy having a main memory at the top of the hierarchy to store a larger quantity of data that can be accessed by the executing instructions, and one or more caches at lower levels of the memory hierarchy to store subsets of the data stored at main memory. Typically, the lower data is stored in the memory hierarchy the more quickly it can be accessed by the processor. To further enhance processing efficiency, the processing system can implement a memory management protocol that governs the particular set of data stored at each level of the memory hierarchy. For example, the processing system can implement a memory management protocol that moves data that has recently been requested for access to lower levels of the memory hierarchy, with the expectation that the data will be accessed again by the processor in the near future, and moves data that has not been accessed recently to higher levels of the memory hierarchy. However, a general memory management protocol that is based on static allocation and replacement policies can result in polluting caches with data that has low reuse potential and wasteful movement of data between levels of the memory hierarchy, impacting both processing efficiency and power consumption of the processing system.

BRIEF DESCRIPTION OF THE DRAWINGS

The present disclosure is better understood, and its numerous features and advantages made apparent to those skilled in the art by referencing the accompanying drawings. The use of the same reference symbols in different drawings indicates similar or identical items.

DETAILED DESCRIPTION

Figure 1:
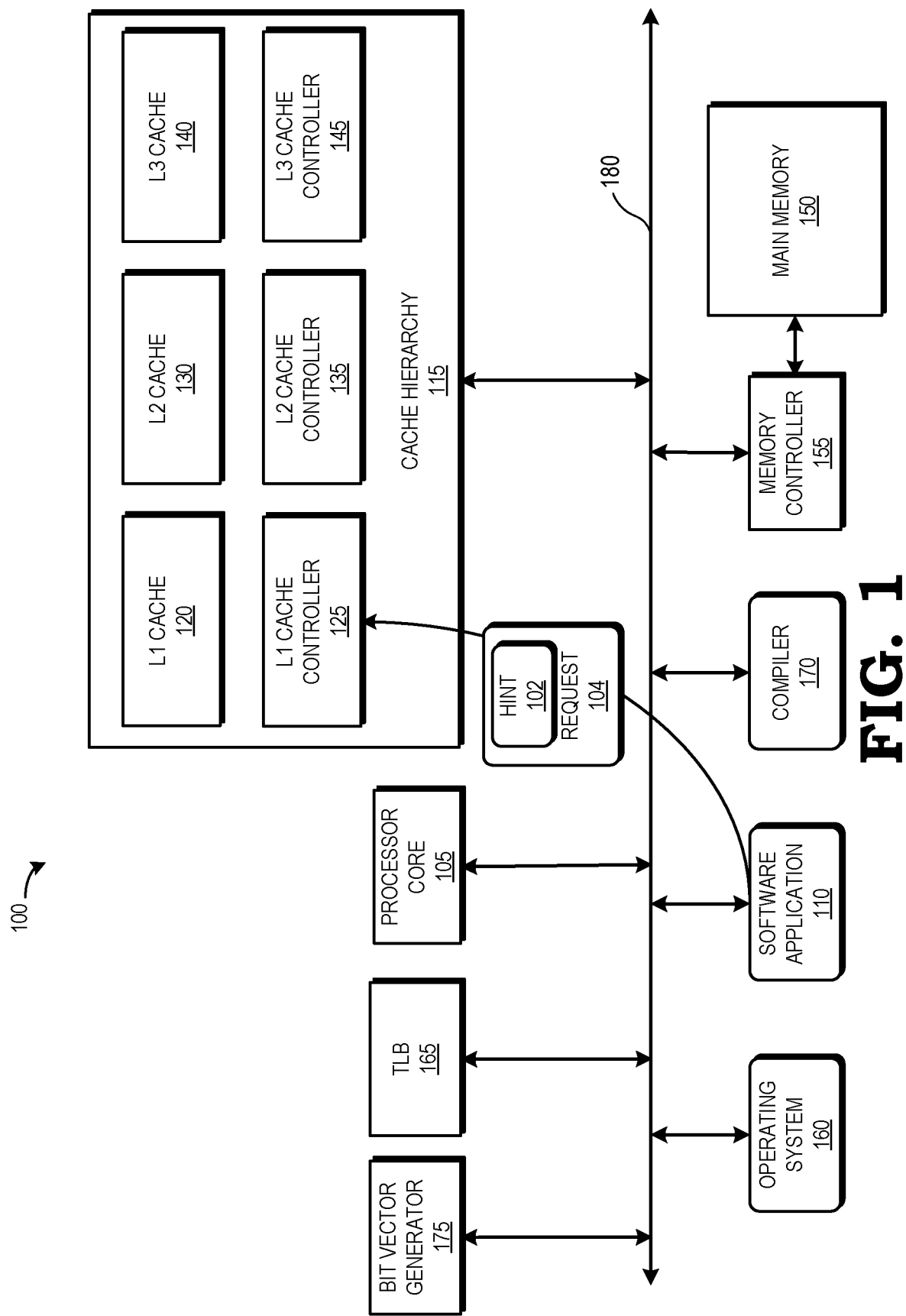
FIG. 1 is a block diagram of a processing system to allocate space for a group of one or more cache lines at a cache level based on memory access patterns of a software application executing at the processing system in accordance with some embodiments.

A processing system including a memory subsystem having a cache hierarchy of multiple cache levels adaptively optimizes cache allocation and replacement policies based on information concerning the granularity and movement of data associated with a software application executing at the processing system. Several programming frameworks use dataflow graph representations that explicitly convey information concerning the granularity and movement of data. Further, an increase in hardware specialization has resulted in an increase in specialized programming models that extract information regarding memory access patterns. The processing system uses the information to determine locality and reuse data that can be passed to the cache hierarchy as hints indicating which cache levels are to allocate space to store groups of one or more cache lines.

In some embodiments, the processing system generates bit vectors indicating which cache levels are to allocate space to store groups of one or more cache lines based on the memory access patterns of the software application. Based on the bit vectors, the processing system provides hints to the cache hierarchy indicating the lowest cache level that can exploit the reuse potential for a particular data. In some embodiments, the cache hierarchy interprets the hints as guidelines or suggestions, such that a hint is one of several factors considered in selecting a cache level at which to store the one or more cache lines. In other embodiments, the cache hierarchy interprets the hints as requirements, such that a hint indicating, for example, that a first cache level is not to allocate space to store a group of one or more cache lines results in the cache hierarchy bypassing the first cache level and storing the one or more cache lines at another cache level of the cache hierarchy.

The processing system stores the bit vectors at common access points such as a translation lookaside buffer (TLB) that is accessed before accessing the cache hierarchy. Each bit vector indicates one or more preferred cache levels for a quantity of data. For example, in a cache hierarchy including three levels of cache, each bit vector includes two to four bits that indicate whether the data should be allocated storage at each cache level. In some embodiments, a table of entries mapping memory pages with bit vectors is accessed in parallel with a TLB for a given cache level. In other embodiments, each TLB entry is coupled with a bit vector. By allocating space at different cache levels for data based on locality and reuse information specific to the memory access patterns of a software application executing at the processing system, the processing system avoids polluting the caches with data that has a low reuse potential and reduces wasteful movement of data in the cache hierarchy. In addition, the processing system leverages the locality and reuse information to increase efficiency for a cache replacement policy. For example, if a bit vector for a quantity of data indicates that the data is to be allocated space at a low cache level, the cache replacement policy weights the data as having a higher reuse potential and a correspondingly lower eviction preference.

FIG. 1 illustrates a processing system 100 to select a cache level to allocate space for a group of one or more cache lines based on memory access patterns of a software application executing at a processor core of the processing system 100 in accordance with some embodiments. The processing system 100 generally executes sets of instructions organized in the form of computer programs in order to carry out tasks on behalf of an electronic device. Accordingly, the processing system 100 can be used in any of a variety of electronic devices, such as a desktop or laptop computer, server, smartphone, tablet, game console, and the like.

The processing system 100 includes one or more processor cores 105, a software application 110, a cache hierarchy 115, a main memory 150, a compiler 170, and a communications infrastructure 180. Access to main memory 150 is managed by a memory controller 155, which is coupled to main memory 150. For example, requests from the processor core 105 or other devices for reading from or for writing to main memory 150 are managed by the memory controller 155. In some embodiments, the one or more software applications 110 include various programs or commands to perform computations that are also executed at the processor core 105. The processing system 100 further includes an operating system 160, a translation lookaside buffer (TLB) 165, and a bit vector generator 175. Components of the processing system 100 are implemented as hard-coded or programmable logic, one or more processors executing software/firmware instructions, or any combination thereof. The software application 110, the operating system 160, and the compiler 170 are represented in FIG. 1 as sets of executable instructions that are stored in memory, such as the main memory 150, and are to manipulate one or more processor cores, such as processor core 105, to perform the associated functions described herein.

The processor core 105 includes (not shown) one or more of a processor, field programmable gate array (FPGA), application specific integrated circuit (ASIC), or digital signal processor (DSP). The processor core 105 executes at least a portion of the control logic that controls the operation of the processing system 100. For example, in various embodiments, the processor core 105 executes the operating system 160, the one or more software applications 110, and a device driver (not shown). In some embodiments, the processor core 105 initiates and controls the execution of the one or more software applications 110 by distributing the processing associated with one or more software applications 110 across the processor core 105 and other processing resources.

Within the processing system 100, the main memory 150 includes non-persistent memory, such as dynamic random access memory (DRAM) (not shown). In various embodiments, the main memory 150 stores processing logic instructions, constant values, variable values during execution of portions of software applications or other processing logic, or other desired information. For example, in various embodiments, parts of control logic to perform one or more operations on the processor core 105 reside within main memory 150 during execution of the respective portions of the operation by the processor core 105. During execution, respective software applications, operating system functions, processing logic commands, and other system software reside in main memory 150. Control logic commands that are fundamental to operating system 160 generally reside in main memory 150 during execution. In some embodiments, other software commands (such as a device driver) also reside in main memory 150 during execution at the processing system 100.

The compiler 170 compiles source code of the software application 110 executing at the processor core 105 into program instructions as needed for execution by the processing system 100. During such compilation, the compiler 170 applies transforms to program instructions at various phases of compilation.

In various embodiments, the communications infrastructure 180 interconnects the components of the processing system 100. The communications infrastructure 180 includes (not shown) one or more of a peripheral component interconnect (PCI) bus, extended PCI (PCI-E) bus, advanced microcontroller bus architecture (AMBA) bus, advanced graphics port (AGP), or other such communication infrastructure and interconnects. In some embodiments, the communications infrastructure 180 also includes an Ethernet network or any other suitable physical communications infrastructure that satisfies a software application's data transfer rate requirements. The communications infrastructure 180 also includes the functionality to interconnect components, including components of the processing system 100.

The cache hierarchy 115 includes a level 1 (L1) cache 120, a level 2 (L2) cache 130, and a level 3 (L3) cache 140, as well as one or more cache controllers such as L1 cache controller 125, L2 cache controller 135, and L3 cache controller 145. The processor core 105 includes one or more instruction pipelines to execute instructions, thereby carrying out tasks on behalf of an electronic device. While in some embodiments the processor core 105 has some amount of integral memory, for example, in the form of a register file, such memory is typically limited in storage capacity. Accordingly, in order to execute instructions, the processor core 105 stores and retrieves data from the memory hierarchy of the processing system 100, including the L1 cache 120, L2 cache 130, L3 cache 140, and main memory 150. In particular, in the course of executing instructions, the processor core 105 generates operations, referred to as memory access requests, to store (a store operation) data at or load (a read operation) data from the memory hierarchy. The L1 cache 120, L2 cache 130, L3 cache 140, and main memory 150 work together to satisfy the memory access requests, as described further herein.

The L1 cache 120 stores data for access by the processor core 105. In at least one embodiment, the L1 cache 120 includes a set of entries, each of which can store an associated unit of data referred to as a cache line. The L1 cache controller 125 operates to receive memory access requests for data from the processor core 105 and search the L1 cache 120 to determine if one of the cache entries stores a cache line associated with the memory address targeted by the memory access request. If the requested cache line is found in the L1 cache 120, a cache hit has occurred. In the event of a cache hit, the L1 cache controller 125 satisfies the memory access request by, in the case of a read operation, providing the requested cache line from the L1 cache 120 to the processor core 105 or, in the case of a write operation, storing the write data to the cache entry. If the requested cache line is not found in the L1 cache 120, a cache miss has occurred. In the event of a cache miss at the L1 cache 120, the L1 cache controller 125 provides the memory access request to the L2 cache 130.

Similar to the L1 cache 120, the L2 cache 130 includes a set of entries, each of which can store an associated cache line. The L2 cache controller 135 operates to receive memory access requests from the L1 cache controller 125 in response to cache misses at the L1 cache 120. In response to receiving a memory access request, the L2 cache controller 135 identifies whether one of the cache entries of the L2 cache 130 stores data associated with the memory address targeted by the memory access request. If so, the L2 cache controller 135 identifies a cache hit, and provides the requested data from the L2 cache 130 to the L1 cache 120. If the requested data is not found in the L2 cache 130, the L2 cache controller identifies a cache miss and provides the memory access request to the L3 cache 140.

As with the L1 cache 120 and L2 cache 130, the L3 cache 140 includes a set of entries, with each entry to store a cache line. The L3 cache controller 145 operates to receive memory access requests from the L2 cache controller 135. In response to receiving a memory access request, the L3 cache controller 145 identifies whether an entry of the L3 cache 140 stores data associated with the memory address targeted by the memory access request. In the event of a cache hit, the L3 cache controller 145 provides the requested data from the L3 cache 140 to the L2 cache 130, which stores the data and in turn provides the data to the L1 cache 120, which satisfies the memory access request as described above. In the event of a cache miss at the L3 cache 140, the L3 cache controller 145 provides the memory access request to the main memory 150. The memory controller 155 retrieves the cache line at the memory address of the main memory 150 targeted by the request and provides the cache line to the L3 cache 140, which in turn provides the cache line to the L2 cache 130 for provision to the L1 cache 120, where the memory access request is satisfied. Thus, as described above, the memory access request traverses the memory hierarchy until the requested data is found.

In some embodiments, each of the L1 cache 120, L2 cache 130, and L3 cache 140 is a set associative cache, wherein each cache is divided into a number of sets. Each set includes a number of ways, with each way corresponding to a cache entry that can store a cache line. Each set only stores a cache line associated with subset of memory addresses, wherein the subset associated with a set is identified by the corresponding cache controller based on a portion of the memory address referred to as the index. By employing set associativity, the caches 120, 130, and 140 facilitate relatively quick identification of cache misses and cache hits. Further, in some embodiments the L3 cache 140 is larger than the L2 cache 130, such that it can employ a larger index size for each of its sets.

In some implementations, the caches 120, 130, and 140 are sized such that they typically are unable to store, at a given point in time, all the data that is requested, or may be requested, by the processor core 105 at that point in time, thereby requiring data to be transferred through the memory hierarchy as described above. To ensure data coherency and efficient transfer of data through the memory hierarchy, each of the cache controllers 125, 135, and 145 implements a replacement policy to identify if there is an entry in a set available to store a received cache line and, if not, to select one of the entries in the set for replacement. The availability of a cache entry is indicated by status information associated with the entry, referred to as the valid status of the entry. In particular, a cache line having an invalid validity status (referred to herein as an invalid cache line) is one that is available to store data and a cache line having a valid validity status (referred to herein as a valid cache line) is one that is not available to store data unless it is replaced. To replace a valid cache line at an entry with an incoming cache line, the cache controller for the cache first evicts the valid cache line by transferring it to one or more other levels of the memory hierarchy, and then stores the incoming cache line at the entry.

To illustrate, in response to a reset of the processing system 100, all cache lines in each of L1 cache 120, L2 cache 130, and L3 cache 140 are set by their respective cache controller to an invalid state. As a cache entry is populated with a cache line retrieved from main memory 150, the corresponding cache controller sets the cache entry to a valid state. A cache way containing a cache line that has been set to an invalid state may receive an incoming cache line, which will displace or overwrite the invalid cache line. When a cache receives a cache line to be stored, it must select a cache way where the cache line is to be stored. If the cache set associated with the incoming cache line has room available (i.e., has one or more cache ways indicated as containing invalid cache lines), the incoming cache line will be stored at one of the invalid ways. However, if all cache ways in the set associated with the incoming cache line are indicated as valid, the cache controller selects a cache line of the set associated with the new cache line to be evicted to make room for the incoming cache line.

The particular criteria employed by a cache controller to select the cache line for replacement is referred to as a replacement policy. For example, a typical replacement policy has the L1 cache controller 125 select for eviction the least recently used cache line (that is, the cache line that was least recently the target of a memory access operation) in the cache set associated with the incoming cache line at the L1 cache 120.

To facilitate improved processing efficiency, the processor core 105 includes a bit vector generator 175 to generate bit vectors that indicate for each quantity of data accessed by the software application 110 at which level or levels of the cache hierarchy the quantity of data is to be allocated space. In some embodiments, the bit vector generator 175 derives information regarding the memory access patterns of the software application 110 from information about the data granularity and movement associated with the software application 110 that is made available outside the compiler 170 through programming frameworks such as Tensorflow, Graphlab, and Spark. Programming frameworks such as Tensorflow, Graphlab, and Spark use dataflow graph representations, and convey information about the granularity and movement of data. When information about the memory access patterns of the software application 110 is not statically available, the bit vector generator 175 derives the information heuristically. The bit vector generator 175 extracts data locality and reuse information from the information about data granularity and movement associated with the software application 110 statically from software at compile time or dynamically at runtime.

The bit vector generator 175 stores information regarding the memory access patterns of the software application 110 inside the bit vectors, and, in some embodiments, the bit vector generator 175 adjusts the bit vectors based on the extracted data locality and reuse information at runtime. For example, in a cache hierarchy 115 including three levels of cache, each bit vector includes a number of bits that indicate whether the data is to be allocated storage at each cache level. In some embodiments, the bit vector generator 175 stores the bit vectors at the translation lookaside buffer (TLB) 165. The TLB 165, as an example, is implemented in a content addressable memory (CAM) to accelerate translation of logical (i.e., virtual) memory addresses to physical memory addresses for requests made by the processor core 105 for data in main memory 150. In some embodiments, the bit vector generator 175 stores the bit vectors at a table of entries (not shown) associated with the TLB 165 which is accessed in parallel with the TLB 165. Each entry of the table maps a page of memory with a bit vector. In other embodiments, the bit vector generator couples a bit vector with each TLB entry.

In some embodiments, the compiler 170 accesses the bit vectors to provide hints to the cache hierarchy 115 indicating which cache levels are to allocate space for a cache line or group of cache lines. In other embodiments, the software application 110 provides the hints to the cache hierarchy 115 at runtime. For example, once the bit vectors are populated, memory access requests 104 are sent to one or more of the L1 cache controller 125, the L2 cache controller 135, and the L3 cache controller 145 with the optimal cache level set as a hint 102 or flag. In response to receiving the hint 102, the cache hierarchy 115 selects a cache level at which to store the cache lines that are the subject of the memory access request 104 based at least in part on the hint 102.

To illustrate, in some embodiments including three cache levels in the cache hierarchy 115, the hint 102 includes two bits to indicate one of four levels at which to allocate space to store a group of one or more cache lines: L1/L2/L3/MEMORY. In operation, a memory access request 104 is sent to the L1 cache controller 125 with a hint 102 indicating the lowest level of cache that can exploit the reuse potential for the group of one or more cache lines. If the hint 102 is set as "L1", the L1 cache controller 125 functions as it would in the absence of the hint 102. That is, in the event of a cache miss, the L1 cache controller 125 evicts a conflicting way in the set, allocates the way to the memory access request 104, and injects the appropriate request to the next cache controller in the protocol for a miss for the type of memory access request 104. The "L1" hint 102 is propagated to the incurring requests and responses in the L2 cache 130, the L3 cache 140, and/or the main memory 150 until the L1 cache controller 125 receives a response for memory access request 104. When the L1 cache controller 125 receives the response, the L1 cache controller 125 checks the hint 102 to find the "L1" hint set and stores the group of one or more cache lines at the earlier allocated set and way. In the event of a cache hit, the L1 cache controller 125 returns the requested group of one or more cache lines to the processor core 105.

However, in some cases the L1 cache 120 is not the lowest level of cache that can exploit the reuse potential for the group of one or more cache lines. For example, if the requested group of one or more cache lines is a data structure that is so large that it would occupy most or all of the L1 cache 120 (or if it exceeds the size of the L1 cache 120), the hint will not be set as "L1". If the hint 102 is set as "L2", the L1 cache controller 125 does not perform a lookup to search for the group of one or more cache lines at the L1 cache 120 and instead sends a request to the next cache controller in the protocol for a miss for the type of memory access request 104, in this case, the L2 cache controller 135. When the L2 cache controller 135 receives the memory access request 104 from the L1 cache controller 125 with the "L2" hint 102 set in the memory access request 104, the L2 cache controller 135 functions as it would in the absence of the hint 102. That is, in the event of a cache miss, the L2 cache controller 135 evicts a conflicting way in the set, allocates the way to the memory access request 104, and injects the appropriate request to the next cache controller in the protocol for a miss for the type of memory access request 104. The "L2" hint 102 is propagated to the incurring requests and responses in the L3 cache 140 and/or the main memory 150 until the L1 cache controller 125 receives a response for memory access request 104. When the L1 cache controller 125 receives the response, the L1 cache controller 125 checks the hint 102 to find the "L2" hint set and forwards the group of one or more cache lines to the processor core 105 without storing the group of one or more cache lines at the L1 cache 120. Hence if the hint is set as "L2", the L1 cache controller 125 bypasses evicting cache lines and allocating space to store the group of one or more cache lines. If the hint 102 is set as "L3" or "MEMORY", the memory access request 104 is forwarded from the L1 cache controller 125 and L2 cache controller 135 as described above, without allocating space to store the group of one or more cache lines requested in the memory access request 104.

In some embodiments, each bit in the bit vector separately indicates an allocation preference for a particular cache level. For example, in a cache hierarchy having three cache levels, each bit vector has three bits that indicate whether the group of one or more cache lines corresponding to the bit vector should be allocated space at each cache level, as opposed to simply indicating the lowest level of cache that can exploit the reuse potential of the data.

In addition, in some embodiments, the cache controllers 125, 135, 145 consider the hint 102 when implementing a cache replacement policy. For example, if a hint 102 indicates that the L1 cache controller 125 is to allocate space to store a group of one or more cache lines at the L1 cache 120, the L1 cache controller 125 considers the group of one or more cache lines to have a higher reuse potential compared to data with a hint 102 indicating that the data is to be allocated space at the L2 cache 130. Accordingly, the L1 cache controller 125 weights data with an "L1" hint 102 such that it is less likely to be evicted from the L1 cache 120 when the L1 cache controller 125 is selecting cache lines for eviction. For example, when the L1 cache controller 125 receives a memory access request 104 with an "L2" hint 102, and all of the ways in the set of the L1 cache 120 corresponding to the data for the memory access request 104 have "L1" hints, the L1 cache controller 125 bypasses the L1 cache 120 and forwards the memory access request 104 to the L2 cache controller 135 instead of applying a default replacement policy to select a replacement victim.

Figure 2:
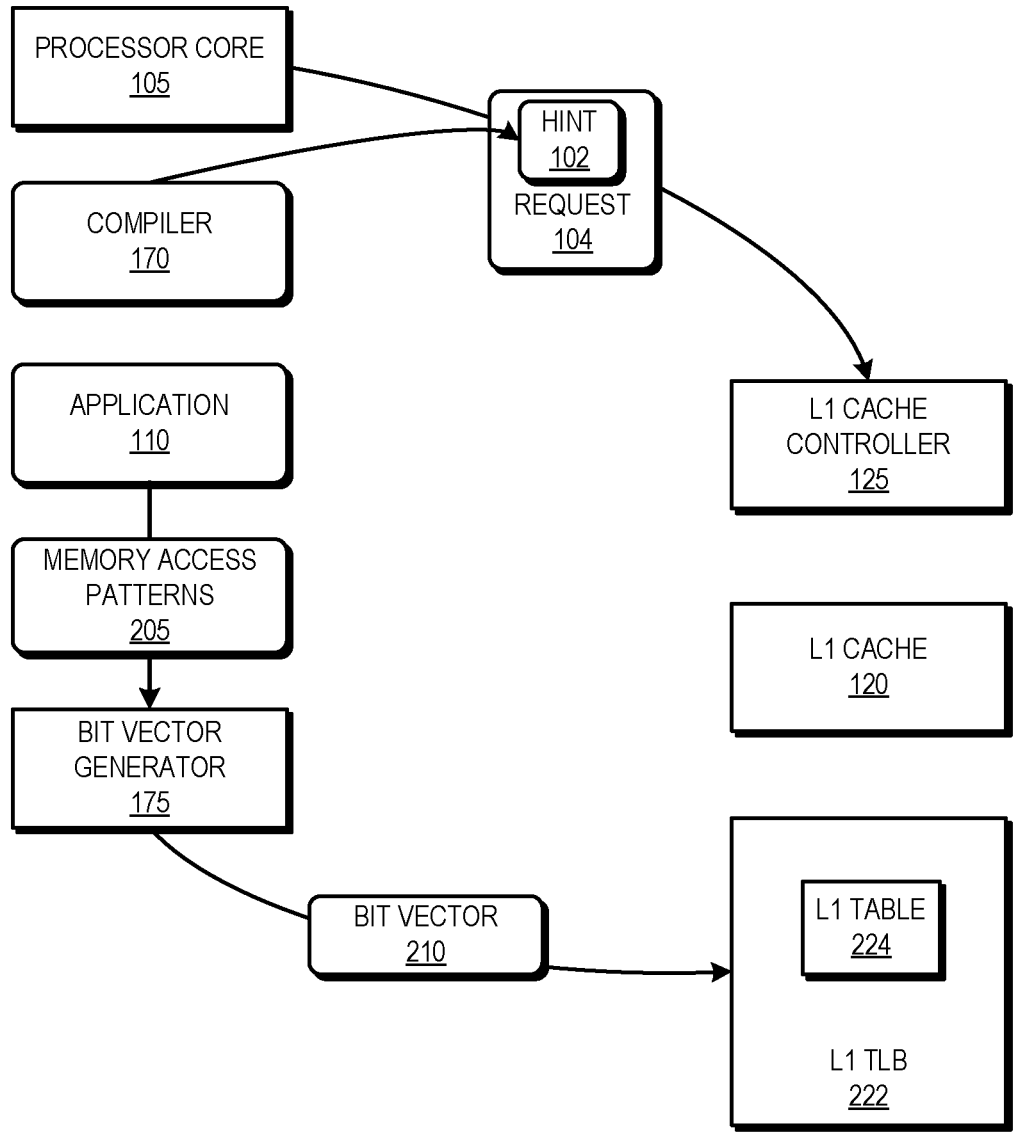
FIG. 2 is a block diagram of a bit vector generator of the processing system of FIG. 1 storing a bit vector indicating which cache levels are to allocate space for a group of one or more cache lines at a translation lookaside buffer in accordance with some embodiments.

FIG. 2 is a block diagram of the bit vector generator 175 of the processing system 100 of FIG. 1 storing a bit vector indicating which cache levels are to allocate space for a group of one or more cache lines at a translation lookaside buffer 165 in accordance with some embodiments. The bit vector generator 175 accesses information about data granularity and movement associated with the software application 110 through a programming framework such as Tensorflow, Graphlab, and Spark. The bit vector generator 175 derives information regarding the memory access patterns 205 of the software application 110 from the data granularity and movement information and generates bit vectors 210 (only one of which is shown in the interest of clarity) for groups of one or more cache lines of data based on the memory access patterns 205. In the illustrated example, the bit vector generator 175 stores the bit vectors 210 at an L1 TLB 222.

In some embodiments, the bit vector generator 175 stores the bit vectors 210 at entries of an L1 table 224 associated with the L1 TLB 222. Each entry of the L1 table 224 maps a page of memory with a bit vector. The L1 table 224 is accessed in parallel with the L1 TLB 222. In other embodiments, the bit vector generator 175 couples a bit vector 210 with each entry of the L1 TLB 222. In some embodiments, the bit vector generator 175 selectively couples the bit vector 210 with one or more of: an entry of the L1 TLB 222 corresponding to the cache line referenced by the hint, an entry of an L2 TLB (not shown) corresponding to the cache line referenced by the hint, an entry of an L3 TLB (not shown) corresponding to the cache line referenced by the hint, and an entry of a TLB for a memory management unit (MMU) (not shown) corresponding to the cache line referenced by the hint. Thus, the bit vector generator 175 selectively couples the bit vector 210 with any of: (1) the L1 TLB 222, (2) the L1 TLB 222 and the L2 TLB, (3) the L2 TLB 222, the L2 TLB, and the L3 TLB, or (4) the L2 TLB 222, the L2 TLB, the L3 TLB, and the MMU.

When the processor core 105 issues a memory access request 104 to the L1 cache controller 125 requesting a group of one or more cache lines, the compiler 170 injects a hint 102 into the memory access request 104 based on the bit vector 210 corresponding to requested group of one or more cache lines. The hint 102 indicates which cache level of the cache hierarchy should allocate space to store the requested group of one or more cache lines. Based on the hint 102, the L1 cache controller 125 selectively allocates space to store the group of one or more cache lines at the L1 cache 120. The L1 cache controller 125 is programmed to interpret the hint 102 either as a guideline or as a requirement. If the L1 cache controller 125 is programmed to interpret the hint 102 as a guideline, the L1 cache controller 125 includes the hint 102 as one of multiple considerations in determining whether to allocate space to store the group of one or more cache lines at the L1 cache 120. If the L1 cache controller 125 is programmed to interpret the hint 102 as a requirement, the L1 cache controller 125 determines whether to allocate space to store the group of one or more cache lines at the L1 cache 120 based solely on the hint 102. By coupling the bit vector with additional levels of TLBs/MMU in some embodiments, the bit vector generator 175 increases the chance that an address translation that misses at the L1 TLB 222 and hits at the L2 (or L3) TLB will result in the hint 102 being provided to the cache controller for the cache level indicated by the hint 102.

Figure 3:
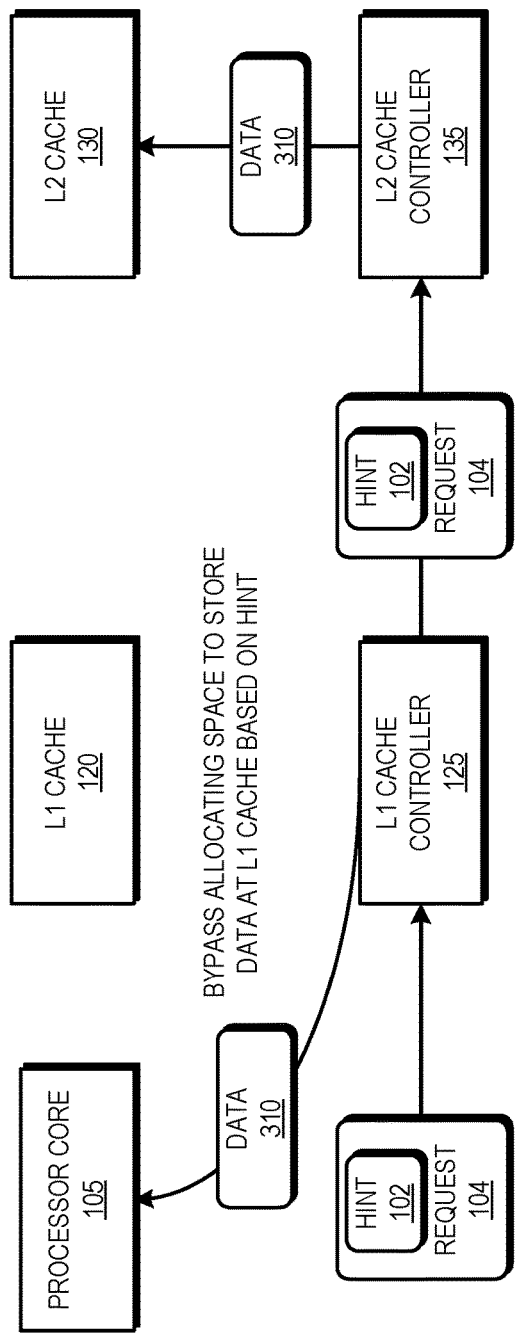
FIG. 3 is a block diagram of a cache controller of the processing system of FIG. 1 bypassing storing a group of one or more cache lines at a cache level based on a hint in accordance with some embodiments.

FIG. 3 is a diagram illustrating an example operation of the L1 cache controller 125 of the processing system 100 of FIG. 1 bypassing allocating space to store a group of one or more cache lines at the L1 cache 120 based on a hint 102 in accordance with some embodiments. The L1 cache controller 125 receives a hint 102 with a memory access request (not shown) for data 310. In the illustrated example, the hint 102 indicates that the L2 cache 130 is to allocate space to store the requested data 310. In response to receiving the hint 102, the L1 cache controller 125 does not perform a lookup of the L1 cache 120 and bypasses allocating space to store the data 310 at the L1 cache 120. The L1 cache controller 125 sends the memory access request 104 to the L2 cache controller 135. When the L2 cache controller 135 receives the memory access request 104 with the "L2" hint 102, in the case of a cache miss at the L2 cache 130, the L2 cache controller 135 evicts a conflicting way in the set corresponding to the requested data 310, allocates the way to the data 310, and forwards the memory access request 104 to the next cache controller in the protocol.

When the data 310 is returned to the L2 cache controller 135, the L2 cache controller 135 stores a copy of the data 310 at the allocated way of the L2 cache 130 and forwards the data 310 to the L1 cache controller 125. When the L1 cache controller 125 receives the data 310, the L1 cache controller 125 forwards the data 310 to the processor core 105 without storing the data 310 in the L1 cache 120.

Figure 4:
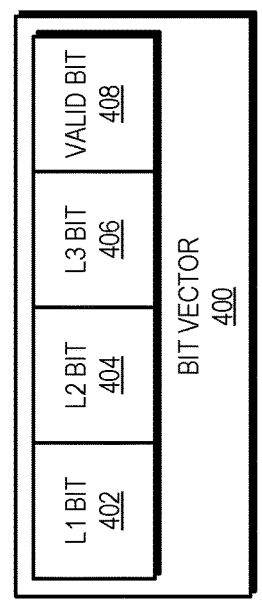
FIG. 4 is a block diagram of a bit vector indicating which cache levels are to allocate space for a group of one or more cache lines based on memory access patterns of a software application executing at the processing system of FIG. 1 in accordance with some embodiments.

FIG. 4 is a block diagram of a bit vector 400 indicating which cache levels of the cache hierarchy 115 of FIG. 1 are to allocate space for a group of one or more cache lines based on memory access patterns of a software application executing at the processing system 100 of FIG. 1 in accordance with some embodiments. The bit vector 400 includes four bits, the first three of which correspond to the three cache levels of the cache hierarchy. Thus, the L1 bit 402 indicates whether the L1 cache 120 is to allocate space to store the group of one or more cache lines corresponding to the bit vector 400. The L2 bit 404 indicates whether the L2 cache 130 is to allocate space to store the group of one or more cache lines. The L3 bit 406 indicates whether the L3 cache 140 is to allocate space to store the group of one or more cache lines. The fourth bit is a valid bit 408 to indicate whether the bit vectors have been populated.

In some embodiments, the bit vector 400 includes two bits to indicate one of four hint types: L1, L2, L3, MEMORY. In other embodiments, the bit vector 400 includes three bits, with the first two bits indicating one of the four hint types and the third bit indicating that the corresponding group of one or more cache lines does not have a hint.

Figure 5:
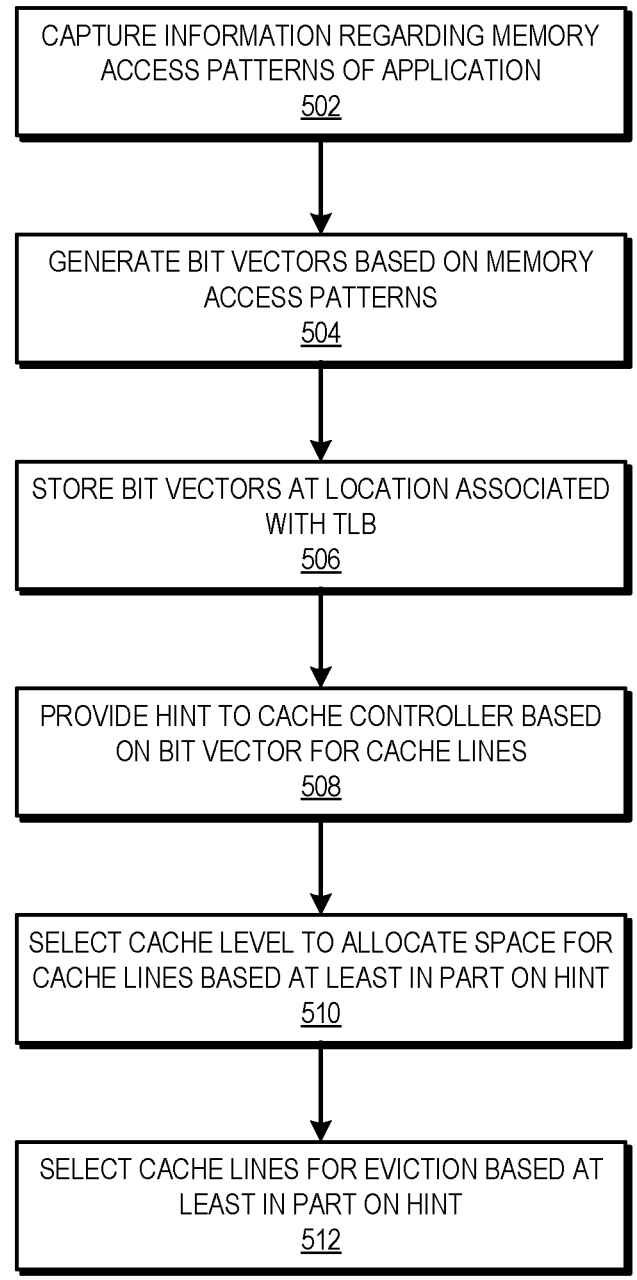
FIG. 5 is a flow diagram illustrating a method for selecting a cache level at which to store a group of one or more cache lines based on memory access patterns of a software application executing at the processing system of FIG. 1 in accordance with some embodiments.

FIG. 5 is a flow diagram illustrating a method 500 for selecting a cache level at which to store a group of one or more cache lines based on memory access patterns of a software application executing at the processing system of FIG. 1 in accordance with some embodiments. At block 502, the bit vector generator 175 captures information regarding memory access patterns of the software application 110 executing at the processor core 105. In some embodiments, the bit vector generator 175 accesses information regarding data granularity and movement associated with the software application 110 through a programming framework such as Tensorflow, Graphlab, and Spark. The bit vector generator 175 then derives information regarding the memory access patterns of the software application 110 from the data granularity and movement information.

At block 504, the bit vector generator generates bit vectors 210 for groups of one or more cache lines of data based on the memory access patterns. The width of each bit vector 210 can vary depending on what information is stored at the bit vector 210 and how the bit vectors 210 are mapped to each page of memory. At block 506, the bit vector generator 175 stores the bit vectors 210 at a common access point such as a location associated with a TLB. In some embodiments, the bit vector generator 175 stores the bit vectors 210 at a table of entries associated with a TLB in which each entry maps a page of memory with a bit vector. The table, such as L1 table 224 of FIG. 2, is accessed in parallel with the L1 TLB 222. In other embodiments, the bit vector generator 175 stores the bit vectors 210 at the TLB. For example, in some embodiments, the bit vector generator 175 couples a bit vector with each entry of the L1 TLB 222. In some embodiments, the bit vector generator 175 selectively couples the bit vector with one or more of an entry of the L1 TLB 222 corresponding to the cache line referenced by the hint, an entry of an L2 TLB corresponding to the cache line referenced by the hint, an entry of an L3 TLB corresponding to the cache line referenced by the hint, and an entry of a TLB for a memory management unit corresponding to the cache line referenced by the hint.

At block 508, the compiler 170 (or, in some embodiments, the software application 110) provides a hint 102 based on the bit vector 210 corresponding to a group of one or more cache lines that is the subject of a memory access request 104 to the L1 cache controller 125 with the memory access request 104. At block 510, the L1 cache controller selectively allocates space at the L1 cache 120 to store the group of one or more cache lines based at least in part on the hint 102. For example, if the hint 102 indicates that the L2 cache 130 is the lowest cache level that can exploit the reuse potential of the group of one or more cache lines, the L1 cache controller 125 bypasses allocating space at the L1 cache 120 to store the group of one or more cache lines.

At block 512, the L1 cache controller 125 selects cache lines for eviction based at least in part on the hint 102. Thus, if the hint 102 indicates that the L2 cache 130 is the lowest cache level that can exploit the reuse potential of the group of one or more cache lines, the L1 cache controller 125, and all the ways of the set of the L1 cache 120 corresponding to the group of one or more cache lines have "L1" hints, the L1 cache controller overrides a default replacement policy to select a replacement victim from the ways of the set and instead forwards the memory access request 104 for the group of one or more cache lines to the L2 cache controller 135.

A computer-readable storage medium includes any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer-readable storage medium in some embodiments is embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above are implemented by one or more processors of a processing system executing software. The software includes one or more sets of executable instructions stored or otherwise tangibly embodied on a non-transitory computer-readable storage medium. The software can include the instructions and certain data that, when executed by the one or more processors, manipulate the one or more processors to perform one or more aspects of the techniques described above. The non-transitory computer-readable storage medium can include, for example, a magnetic or optical disk storage device, solid state storage devices such as Flash memory, a cache, random access memory (RAM) or other non-volatile memory device or devices, and the like. The executable instructions stored on the non-transitory computer-readable storage medium are in source code, assembly language code, object code, or other instruction format that is interpreted or otherwise executable by one or more processors.

Note that not all of the activities or elements described above in the general description are required, that a portion of a specific activity or device are not necessarily required, and that one or more further activities could be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that could cause any benefit, advantage, or solution to occur or become more pronounced are not to be construed as a critical, required, or essential feature of any or all the claims. Moreover, the particular embodiments disclosed above are illustrative only, as the disclosed subject matter can be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above can be altered or modified and all such variations are considered within the scope of the disclosed subject matter. Accordingly, the protection sought herein is as set forth in the claims below.

What is claimed is:

1. A method, comprising:
providing a hint to a cache controller of a first cache level of a cache hierarchy of a processing system, the cache hierarchy comprising a plurality of cache levels, and the hint indicating one or more cache levels of the cache hierarchy that are to allocate space to store one or more cache lines, wherein the hint is based on information made available outside a compiler of the processing system regarding granularity and movement of data associated with a software application executing at a processor core of the processing system; and
selectively allocating space to store the one or more cache lines at the first cache level based on the hint.

2. The method of claim 1, further comprising:
storing the hint at a location associated with a first entry of a first translation lookaside buffer (TLB) corresponding to the one or more cache lines.

3. The method of claim 2, wherein the storing comprises storing the hint at a first table associated with the first TLB, wherein each entry of the first table maps at least one page with at least one hint.

4. The method of claim 2, wherein the storing comprises storing the hint at the first entry of the first TLB.

5. The method of claim 1, wherein the hint indicates the lowest cache level that can exploit a reuse potential for the one or more cache lines.

6. The method of claim 1, wherein selectively allocating space to store the one or more cache lines at the first cache level comprises bypassing storing the one or more cache lines at the first cache level based on the hint indicating that the first cache level is not to allocate space to store the one or more cache lines.

7. The method of claim 1, further comprising:
capturing information regarding the granularity and movement of data associated with the software application; and
generating a bit vector based on the information indicating which cache levels are to allocate space to store the one or more cache lines of data associated with the software application, and wherein the hint is based on the bit vector.

8. The method of claim 7, further comprising:
selectively coupling the bit vector with at least one of: a first entry of a first level translation lookaside buffer (TLB), the first entry corresponding to the one or more cache lines; a second entry of a second level TLB, the second entry corresponding to the one or more cache lines; a third entry of a third level TLB, the third entry corresponding to the one or more cache lines; and a fourth entry of a memory management unit TLB, the fourth entry corresponding to the one or more cache lines.

9. A method, comprising:
capturing, at a compiler of a processing system, information made available outside the compiler regarding data granularity and movement associated with a software application executing at a processor core of the processing system;
providing a hint to a first cache controller of a first cache level of a cache hierarchy comprising a plurality of cache levels of the processing system, the hint indicating one or more cache levels that are to allocate space to store one or more cache lines corresponding to an entry of a first translation lookaside buffer (TLB), wherein the hint is based on the information and is associated with the entry of the first TLB; and
selectively allocating space to store the one or more cache lines at the first cache level based at least in part on the hint.

10. The method of claim 9, further comprising:
providing the hint to a second cache controller of a second cache level of the cache hierarchy; and
selectively allocating space to store the one or more cache lines at the second cache level based at least in part on the hint.

11. The method of claim 9, further comprising:
storing the hint at a first table associated with the first TLB, wherein the first TLB is associated with the first cache level.

12. The method of claim 11, further comprising:
generating a bit vector based on the information indicating which cache levels are to allocate space to store the one or more cache lines of data associated with the software application, and wherein the hint is based on the bit vector; and
selectively coupling the bit vector with at least one of: a first entry of a first level TLB, a second entry of a second level TLB, a third entry of a third level TLB, and a fourth entry of a memory management unit TLB.

13. The method of claim 9, further comprising:
storing the hint at the entry of the first TLB.

14. The method of claim 9, wherein the hint indicates the lowest level of cache that can exploit a reuse potential for the one or more cache lines.

15. The method of claim 9, wherein selectively allocating space to store the one or more cache lines at the first cache level comprises bypassing storing the one or more cache lines at the first cache level based on the hint indicating that the first cache level is not to allocate space to store the one or more cache lines.

16. A processing system, comprising:
a processor;
a cache hierarchy comprising a plurality of cache levels;
a translation lookaside buffer (TLB); and
a cache controller of a cache level of the cache hierarchy, the cache controller configured to:
access a hint indicating one or more cache levels that are to allocate space to store one or more cache lines corresponding to an entry of the TLB, wherein the hint is based on information made available outside a compiler of the processing system regarding granularity and movement of data associated with a software application executing at the processor and wherein the hint is associated with the entry of the TLB; and
selectively allocate space to store the one or more cache lines at the cache level based at least in part on the hint.

17. The processing system of claim 16, wherein the hint indicates the lowest level of the plurality of cache levels that can exploit a reuse potential for the one or more cache lines.

18. The processing system of claim 16, further comprising:
a bit vector generator configured to:
capture information regarding data granularity and movement associated with the software application; and
generate bit vectors indicating which levels of cache are to allocate space to store groups of one or more cache lines of data associated with the software application, and wherein the hint is based on one of the bit vectors.

19. The processing system of claim 18, further comprising:
a table associated with the TLB configured to store the bit vectors.

20. The processing system of claim 18, wherein the TLB is configured to couple a bit vector with the entry of the TLB.

* * * * *